US008843559B2

(12) United States Patent
Brown

(10) Patent No.: US 8,843,559 B2
(45) Date of Patent: *Sep. 23, 2014

(54) MODIFYING PAYLOADS OF DIGITAL STREAMS FOR DIGITAL CONFERENCING

(75) Inventor: Scott K. Brown, Sterling, VA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/620,906

(22) Filed: Sep. 15, 2012

(65) Prior Publication Data

US 2013/0063546 A1 Mar. 14, 2013

Related U.S. Application Data

(63) Continuation of application No. 13/053,903, filed on Mar. 22, 2011, now Pat. No. 8,463,853, which is a continuation of application No. 11/549,934, filed on Oct. 16, 2006, now Pat. No. 7,921,157, which is a continuation of application No. 10/134,439, filed on Apr. 30, 2002, now Pat. No. 7,124,166.

(60) Provisional application No. 60/343,182, filed on Dec. 31, 2001, provisional application No. 60/286,964, filed on Apr. 30, 2001.

(51) Int. Cl.
*G06F 15/16* (2006.01)

(52) U.S. Cl.
USPC ........... 709/204; 709/205; 709/231; 709/238; 709/244; 709/245; 370/260; 370/261; 370/290; 348/14.08

(58) Field of Classification Search
USPC .......... 709/204, 205, 244, 245, 231; 370/260, 370/390, 261
See application file for complete search history.

(56) References Cited

U.S. PATENT DOCUMENTS 4,809,262 A 2/1989 Klose et al.
4,872,160 A 10/1989 Hemmady et al.
(Continued)

FOREIGN PATENT DOCUMENTS

CA 2445869 11/2002
CN 1511289 7/2004
(Continued)

OTHER PUBLICATIONS

Keller et al., An Active Router Architecture for Multicast Video Distribution, St. Louis, Missouri.
(Continued)

*Primary Examiner* — Mohammad A Siddiqi
(74) *Attorney, Agent, or Firm* — Keller Jolley Preece

(57) ABSTRACT

Using switching technologies to duplicate packets of a digital stream (e.g., digital video stream) sent from one workstation to multiple recipient workstations, where the switching technologies enable the multiple streams sent from the switch to the recipient workstations to be generated from a single digital stream sent from the sending workstation to the switch. Data units, such as video data units, may be transmitted by using a switch to enable receipt of a stream of data units including a payload portion and an attribute portion from at least two conferencing participants. The switch is used to duplicate at least a subportion of the payload portion of a data unit within the stream of data units, and to enable access to the duplicated subportion of the data unit by two or more conferencing participants.

33 Claims, 6 Drawing Sheets

(56) References Cited

U.S. PATENT DOCUMENTS

| | | | |
|---|---|---|---|
| 5,014,125 A | 5/1991 | Pocock et al. | |
| 5,283,639 A | 2/1994 | Esch et al. | |
| 5,493,568 A | 2/1996 | Sampat et al. | |
| 5,543,856 A | 8/1996 | Rosser et al. | |
| 5,583,561 A | 12/1996 | Baker et al. | |
| 5,600,364 A | 2/1997 | Hendricks et al. | |
| 5,600,646 A | 2/1997 | Polomski | |
| 5,604,542 A | 2/1997 | Dedrick | |
| 5,608,446 A | 3/1997 | Carr et al. | |
| 5,646,675 A | 7/1997 | Copriviza et al. | |
| 5,682,597 A | 10/1997 | Ganek et al. | |
| 5,689,641 A | 11/1997 | Ludwig et al. | |
| 5,742,597 A | 4/1998 | Holt et al. | |
| 5,774,660 A | 6/1998 | Brendel et al. | |
| 5,778,187 A | 7/1998 | Monteiro et al. | |
| 5,799,002 A | 8/1998 | Krishnan | |
| 5,802,301 A | 9/1998 | Dan et al. | |
| 5,809,237 A | 9/1998 | Watts et al. | |
| 5,815,662 A | 9/1998 | Ong | |
| 5,819,036 A | 10/1998 | Adams et al. | |
| 5,838,790 A | 11/1998 | McAuliffe et al. | |
| 5,838,912 A | 11/1998 | Poon et al. | |
| 5,841,763 A | 11/1998 | Leondires et al. | |
| 5,867,502 A | 2/1999 | Chang | |
| 5,872,588 A | 2/1999 | Aras et al. | |
| 5,889,950 A | 3/1999 | Kuzma | |
| 5,907,324 A | 5/1999 | Larson et al. | |
| 5,913,062 A | 6/1999 | Vrvilo et al. | |
| 5,917,830 A | 6/1999 | Chen et al. | |
| 5,920,700 A | 7/1999 | Gordon et al. | |
| 5,935,245 A | 8/1999 | Sherer | |
| 5,946,614 A | 8/1999 | Robbins et al. | |
| 5,961,603 A | 10/1999 | Kunkel et al. | |
| 5,969,770 A * | 10/1999 | Horton | 348/569 |
| 5,973,722 A | 10/1999 | Wakai et al. | |
| 5,983,005 A | 11/1999 | Monteiro et al. | |
| 5,995,943 A | 11/1999 | Bull et al. | |
| 6,006,265 A | 12/1999 | Rangan et al. | |
| 6,011,782 A | 1/2000 | DeSimone et al. | |
| 6,018,766 A * | 1/2000 | Samuel et al. | 709/218 |
| 6,034,746 A | 3/2000 | Desai et al. | |
| 6,052,805 A | 4/2000 | Chen et al. | |
| 6,061,349 A | 5/2000 | Coile et al. | |
| 6,061,504 A | 5/2000 | Tzelnic et al. | |
| 6,064,376 A | 5/2000 | Berezowski et al. | |
| 6,097,720 A | 8/2000 | Araujo et al. | |
| 6,101,187 A | 8/2000 | Cukier et al. | |
| 6,115,752 A | 9/2000 | Chauhan | |
| 6,119,163 A | 9/2000 | Monteiro et al. | |
| 6,141,336 A | 10/2000 | Bauchot et al. | |
| 6,151,621 A | 11/2000 | Colyer et al. | |
| 6,151,632 A | 11/2000 | Chaddha et al. | |
| 6,157,635 A | 12/2000 | Wang et al. | |
| 6,173,314 B1 | 1/2001 | Kurashima et al. | |
| 6,189,039 B1 | 2/2001 | Harvey et al. | |
| 6,195,680 B1 | 2/2001 | Goldszmidt et al. | |
| 6,201,859 B1 | 3/2001 | Memhard et al. | |
| 6,208,975 B1 | 3/2001 | Bull et al. | |
| 6,216,129 B1 | 4/2001 | Eldering | |
| 6,226,686 B1 * | 5/2001 | Rothschild et al. | 709/245 |
| 6,253,238 B1 | 6/2001 | Lauder et al. | |
| 6,259,701 B1 | 7/2001 | Shur et al. | |
| 6,266,335 B1 | 7/2001 | Bhaskaran | |
| 6,298,088 B1 | 10/2001 | Bhatt et al. | |
| 6,298,089 B1 | 10/2001 | Gazit | |
| 6,298,129 B1 | 10/2001 | Culver et al. | |
| 6,308,327 B1 | 10/2001 | Liu et al. | |
| 6,314,451 B1 | 11/2001 | Landsman et al. | |
| 6,314,464 B1 | 11/2001 | Murata et al. | |
| 6,327,622 B1 | 12/2001 | Jindal et al. | |
| 6,339,761 B1 | 1/2002 | Cottingham | |
| 6,347,090 B1 | 2/2002 | Ooms et al. | |
| 6,357,042 B2 | 3/2002 | Srinivasan et al. | |
| 6,360,195 B1 | 3/2002 | Liao et al. | |
| 6,363,075 B1 | 3/2002 | Huang et al. | |
| 6,363,429 B1 | 3/2002 | Ketcham | |
| 6,370,112 B1 | 4/2002 | Voelker | |
| 6,377,996 B1 | 4/2002 | Lumelsky et al. | |
| 6,381,746 B1 | 4/2002 | Urry | |
| 6,389,462 B1 | 5/2002 | Cohen et al. | |
| 6,404,745 B1 | 6/2002 | O'Neil et al. | |
| 6,411,773 B1 | 6/2002 | De Vos et al. | |
| 6,415,312 B1 | 7/2002 | Boivie | |
| 6,415,323 B1 | 7/2002 | McCanne et al. | |
| 6,418,214 B1 | 7/2002 | Smythe et al. | |
| 6,434,622 B1 | 8/2002 | Monteiro et al. | |
| 6,437,830 B1 | 8/2002 | Horlander | |
| 6,449,657 B2 | 9/2002 | Stanbach et al. | |
| 6,457,043 B1 | 9/2002 | Kwak et al. | |
| 6,466,550 B1 | 10/2002 | Foster et al. | |
| 6,490,285 B2 | 12/2002 | Lee et al. | |
| 6,490,320 B1 | 12/2002 | Vetro et al. | |
| 6,493,872 B1 | 12/2002 | Rangan et al. | |
| 6,505,169 B1 | 1/2003 | Bhagavath et al. | |
| 6,510,553 B1 | 1/2003 | Hazra | |
| 6,516,350 B1 | 2/2003 | Lumelsky et al. | |
| 6,526,426 B1 | 2/2003 | Lakritz | |
| 6,564,003 B2 | 5/2003 | Marko et al. | |
| 6,564,380 B1 | 5/2003 | Murphy | |
| 6,587,138 B1 | 7/2003 | Vogt et al. | |
| 6,606,581 B1 | 8/2003 | Nickerson et al. | |
| 6,615,039 B1 | 9/2003 | Eldering | |
| 6,622,174 B1 | 9/2003 | Ukita et al. | |
| 6,625,773 B1 * | 9/2003 | Boivie et al. | 714/749 |
| 6,646,997 B1 | 11/2003 | Baxley et al. | |
| 6,665,726 B1 | 12/2003 | Leighton et al. | |
| 6,684,249 B1 | 1/2004 | Frerichs et al. | |
| 6,698,020 B1 | 2/2004 | Zigmond et al. | |
| 6,701,355 B1 | 3/2004 | Brandt et al. | |
| 6,704,930 B1 | 3/2004 | Eldering et al. | |
| 6,708,213 B1 | 3/2004 | Bommaiah et al. | |
| 6,711,212 B1 | 3/2004 | Lin | |
| 6,718,551 B1 | 4/2004 | Swix et al. | |
| 6,728,356 B1 | 4/2004 | Carroll | |
| 6,728,784 B1 | 4/2004 | Mattaway | |
| 6,738,978 B1 | 5/2004 | Hendricks et al. | |
| 6,751,219 B1 | 6/2004 | Lipp et al. | |
| 6,785,704 B1 | 8/2004 | McCanne | |
| 6,826,185 B1 | 11/2004 | Montanaro et al. | |
| 6,839,734 B1 * | 1/2005 | Vega-Garcia et al. | 709/204 |
| 6,847,618 B2 | 1/2005 | Laursen et al. | |
| 6,850,707 B1 | 2/2005 | Chang et al. | |
| 6,856,967 B1 | 2/2005 | Woolston et al. | |
| 6,873,627 B1 | 3/2005 | Miller et al. | |
| 6,879,565 B2 | 4/2005 | Baxley et al. | |
| 6,889,385 B1 | 5/2005 | Rakib et al. | |
| 6,891,828 B2 | 5/2005 | Ngai | |
| 6,910,078 B1 | 6/2005 | Raman et al. | |
| 6,978,470 B2 | 12/2005 | Swix et al. | |
| 6,993,081 B1 | 1/2006 | Brunheroto et al. | |
| 6,996,102 B2 | 2/2006 | Pegrum et al. | |
| 7,007,235 B1 | 2/2006 | Hussein et al. | |
| 7,016,351 B1 | 3/2006 | Farinacci et al. | |
| 7,039,932 B2 | 5/2006 | Eldering | |
| 7,054,949 B2 | 5/2006 | Jennings | |
| 7,062,510 B1 | 6/2006 | Eldering | |
| 7,072,972 B2 | 7/2006 | Chin et al. | |
| 7,089,577 B1 | 8/2006 | Rakib et al. | |
| 7,100,183 B2 | 8/2006 | Kunkel et al. | |
| 7,124,166 B2 * | 10/2006 | Brown | 709/204 |
| 7,133,922 B1 | 11/2006 | She et al. | |
| 7,142,509 B1 | 11/2006 | Rovner et al. | |
| 7,187,690 B2 | 3/2007 | Taylor | |
| 7,203,758 B2 | 4/2007 | Cook et al. | |
| 7,237,033 B2 | 6/2007 | Weigand et al. | |
| 7,266,609 B2 | 9/2007 | Bill et al. | |
| 7,292,571 B2 | 11/2007 | Brown | |
| 7,299,291 B1 | 11/2007 | Shaw | |
| 7,394,850 B1 | 7/2008 | Gordon | |
| 7,430,609 B2 | 9/2008 | Brown et al. | |
| 7,447,738 B1 | 11/2008 | Andrews et al. | |
| 7,500,258 B1 | 3/2009 | Eldering | |
| 7,548,962 B2 | 6/2009 | Weber et al. | |
| 7,694,013 B2 | 4/2010 | Weigand | |

(56) References Cited

U.S. PATENT DOCUMENTS

| | | | |
|---|---|---|---|
| 7,711,791 | B2 | 5/2010 | DuVall et al. |
| 7,895,076 | B2 | 2/2011 | Kutaragi et al. |
| 7,921,157 | B2 * | 4/2011 | Brown .......................... 709/204 |
| 7,991,911 | B2 | 8/2011 | Weigand |
| 8,028,092 | B2 | 9/2011 | Brown et al. |
| 8,094,647 | B2 | 1/2012 | Elliott et al. |
| 8,130,755 | B2 | 3/2012 | Brown |
| 8,135,620 | B2 | 3/2012 | Barsade et al. |
| 8,224,991 | B2 | 7/2012 | Weigand |
| 8,463,853 | B2 * | 6/2013 | Brown .......................... 709/204 |
| 2001/0018771 | A1 | 8/2001 | Walker et al. |
| 2001/0030667 | A1 | 10/2001 | Kelts |
| 2001/0036198 | A1 | 11/2001 | Arsenault et al. |
| 2001/0044851 | A1 | 11/2001 | Rothman et al. |
| 2001/0047516 | A1 | 11/2001 | Swain et al. |
| 2001/0048662 | A1 | 12/2001 | Suzuki et al. |
| 2001/0049620 | A1 | 12/2001 | Blasko |
| 2002/0013852 | A1 | 1/2002 | Janik et al. |
| 2002/0015496 | A1 | 2/2002 | Weaver et al. |
| 2002/0019845 | A1 | 2/2002 | Hariton |
| 2002/0019984 | A1 | 2/2002 | Rakib |
| 2002/0023267 | A1 | 2/2002 | Hoang |
| 2002/0024956 | A1 | 2/2002 | Keller-Tuberg |
| 2002/0026482 | A1 | 2/2002 | Morishige et al. |
| 2002/0026636 | A1 | 2/2002 | LeComte |
| 2002/0031126 | A1 | 3/2002 | Crichton et al. |
| 2002/0040404 | A1 | 4/2002 | Lahr |
| 2002/0059591 | A1 | 5/2002 | Nakagawa |
| 2002/0065922 | A1 | 5/2002 | Shastri |
| 2002/0082914 | A1 | 6/2002 | Beyda et al. |
| 2002/0093963 | A1 | 7/2002 | Roullet et al. |
| 2002/0103863 | A1 | 8/2002 | Pearson |
| 2002/0103864 | A1 | 8/2002 | Rodman et al. |
| 2002/0112004 | A1 | 8/2002 | Reid et al. |
| 2002/0112069 | A1 | 8/2002 | Sim |
| 2002/0114302 | A1 | 8/2002 | McDonald et al. |
| 2002/0116532 | A1 | 8/2002 | Berg |
| 2002/0126685 | A1 | 9/2002 | Leatherbury et al. |
| 2002/0131400 | A1 | 9/2002 | Tinsely et al. |
| 2002/0161847 | A1 | 10/2002 | Weigand et al. |
| 2002/0161910 | A1 | 10/2002 | Bill et al. |
| 2002/0172508 | A1 | 11/2002 | Zennou |
| 2002/0191543 | A1 | 12/2002 | Buskirk et al. |
| 2002/0191950 | A1 | 12/2002 | Wang |
| 2003/0005052 | A1 | 1/2003 | Feuer et al. |
| 2003/0018966 | A1 | 1/2003 | Cook et al. |
| 2003/0018968 | A1 | 1/2003 | Avnet |
| 2003/0061278 | A1 | 3/2003 | Agarwalla et al. |
| 2003/0067934 | A1 | 4/2003 | Hooper et al. |
| 2003/0099202 | A1 | 5/2003 | Lear et al. |
| 2003/0126197 | A1 | 7/2003 | Black et al. |
| 2003/0145038 | A1 | 7/2003 | Bin Tariq et al. |
| 2003/0188308 | A1 | 10/2003 | Kizuka |
| 2004/0025186 | A1 | 2/2004 | Jennings et al. |
| 2004/0205829 | A1 | 10/2004 | Hane, III |
| 2005/0010653 | A1 | 1/2005 | McCanne |
| 2005/0015796 | A1 | 1/2005 | Bruckner et al. |
| 2005/0036030 | A1 | 2/2005 | Forkner et al. |
| 2006/0248231 | A1 | 11/2006 | O'Rourke et al. |
| 2008/0049723 | A1 | 2/2008 | Bill |
| 2009/0150937 | A1 | 6/2009 | Ellis et al. |
| 2011/0173054 | A1 | 7/2011 | Kutaragi et al. |
| 2011/0208582 | A1 | 8/2011 | Hoyle |
| 2011/0225046 | A1 | 9/2011 | Eldering et al. |
| 2011/0231255 | A1 | 9/2011 | Urbanski et al. |
| 2012/0066058 | A1 | 3/2012 | Brown |
| 2013/0010794 | A1 | 1/2013 | Bill |
| 2013/0016721 | A1 | 1/2013 | Bill |
| 2013/0063545 | A1 | 3/2013 | Brown |
| 2013/0066904 | A1 | 3/2013 | Brown |
| 2013/0173820 | A1 | 7/2013 | Weigand et al. |
| 2013/0173821 | A1 | 7/2013 | Weigand et al. |

FOREIGN PATENT DOCUMENTS

| | | |
|---|---|---|
| EP | 1063814 | 12/2000 |
| EP | 1071287 | 1/2001 |
| EP | 1220542 | 7/2002 |
| EP | 2395700 | 12/2011 |
| GB | 2309849 | 8/1997 |
| JP | 08-320800 | 12/1996 |
| JP | 9270793 | 10/1997 |
| JP | 11-232201 | 8/1999 |
| JP | 11-261580 | 9/1999 |
| JP | 2000-010895 | 1/2000 |
| JP | 2000-029813 | 1/2000 |
| JP | 2000-172618 | 6/2000 |
| JP | 2000-244427 | 9/2000 |
| JP | 2001-508258 | 5/2001 |
| JP | 2002-280982 | 9/2002 |
| JP | 2002-281483 | 9/2002 |
| JP | 2002-330416 | 11/2002 |
| JP | 2002-354449 | 12/2002 |
| JP | 2003-111052 | 4/2003 |
| JP | 2003-284041 | 10/2003 |
| JP | 2004-536494 | 12/2004 |
| WO | 96/38961 | 12/1996 |
| WO | 98/31107 | 7/1998 |
| WO | 99/27741 | 6/1999 |
| WO | 00/28713 | 5/2000 |
| WO | 00/65775 | 11/2000 |
| WO | 00/65776 | 11/2000 |
| WO | 00/69101 | 11/2000 |
| WO | 00/69163 | 11/2000 |
| WO | 00/74373 | 12/2000 |
| WO | 02/88982 | 11/2002 |

OTHER PUBLICATIONS

Lockwood et al., Reprogrammable Network Packet Processing on the Field Programmable Port Extender (FPX), 2001, St. Louis Missouri.

Taylor et al., Dynamic Hardware Plugins (DHP): Exploitating Reconfigurable Hardware for High Performance Programmable Routers, 2002, St. Louis, Missouri.

Choi et al., Design of a Flexible Open Platform for High Performance Active Networks, 1999, St. Louis, Missouri.

PCT International Search Report, issued in PCT/US02/41769, Apr. 8, 2003, 6 pages.

International Search Report dated Jul. 2, 2003, (App No. PCT/US03/12086).

International Preliminary Examination Report (IPER), dated Feb. 24, 2004, App No. PCT/US02/13362.

F. Gong: Multipoint audio and video control for packet-based multimedia conferencing (1994), International Multimedia Conference, pp. 425-432, ISBN: 0-89791-686-7.

Chinese Office Action mailed Aug. 12, 2005 in Application No. 02810729.2.

Chinese Office Action mailed Nov. 2, 2007 in Application No. 02810729.2.

Chinese Office Action mailed May 30, 2008 in Application No. 02810729.2.

International Search Report dated Jul. 12, 2002, issued in PCT/US02/13363.

International Search Report dated Oct. 29, 2002, issued in PCT/US02/13362.

Office Action for Japanese Application 2002-586120 dated Apr. 10, 2008, 1 page.

Miyazaki, S., et al., "Stream Transmission Control Application Program Interface," Technical Report of IEICE, vol. 100, No. 672, pp. 341-346, in Japanese with English-language Abstract and and English-language excerpt, 11 pages total.

Furht, B. et al., "IP Simulcast: A New Technique for Multimedia Broadcasting Over the Internet;" Cit. Journal of Computing and Information Technology, Zagreb, HR, vol. 6, No. 3, Sep. 1, 1998, pp. 245-254, XP000870379, ISSN: 1330-1136.

ST2 Working Group L. Degrossi & L. Berger et al., "Internet Stream Protocol Version 2 (ST2) Protocol Specification—Version ST2+;

(56) References Cited

OTHER PUBLICATIONS rfc1819.txt" IETF Standard Internet Engineering Task Force, IETF, CH, Aug. 1, 1995, XP015007606 ISSN: 0000-0003, Chapter 1, p. 6-p. 19.
Examination Report for European Application No. 02734066.0, mailed Apr. 16, 2009.
Australian Office Action issued in 200205256 of Feb. 9, 2007.
Australian Office Action issued in 200205256 of May 26, 2008.
Canadian Intellectual Property Office, Office Action of Jan. 19, 2011, App No. 2,445,869 (3 pages).
Chinese Office Action issued in 02810728.4 on Feb. 29, 2008.
Chinese Office Action issued in 02810728.4 on Jul. 13, 2007.
Chinese Office Action issued in 02810728.4 on Jun. 23, 2006.
European Office Action issued EP 02725839.1 on Apr. 16, 2009, 5 pages.
Indian Office Action issued in 1764/DELNP/2003 on Apr. 16, 2008.
Office Action for Japanese Application 2002-586120 dated Oct. 10, 2008, 1 page.
Office Action for Japanese Application 2002-586120 dated Mar. 4, 2008, 1 page.
Supplemental European Search Report Issued in EP 02734066.0 on Jul. 31, 2006.
Oh-ishi, Tetsuya, et al. "Contents Delivery Function over Managed Network," IEICE Technical Report, vol. 101, No. 120, Jun. 14, 2001.
Supplementary European Search Report issued in EP 02725839 on Nov. 18, 2008.
Chickering, David Maxwell et al. "Targeted advertising with inventory management." Proceedings of the 2nd ACM conference on Electronic Commerce. Minneapolis, 2000. pp. 145-149. ACM Press.
Langheinrich, Marc et al. "Unintrusive Customization techniques for Web Advertising". Proceeding of the eighth international conference on World Wide Web. Computer Networks. Amsterdam, Netherlands, 1999. pp. 1259-1272.
Mobasher, Bamshad et al. "Effective Personalization based on Association Rule Discovery from Web Usage Data." Proceedings of the 3rd International workshop on Web Information and Data Management. Atlanta, 2001. pp. 9-15. ACM Press.
Nakano, Tadashi et al. "User Adaptive Content Delivery Mechanism on the World Wide Web." Proceedings of the 2002 ACM symposium on Applied Computing. Madrid, Spain. 2002. pp. 1140-1146. ACM Press.
Datta, Anindya et al. "An Architecture to support scalable online personalization on the web." The VLDB Journal. vol. 10, Issue 1. Aug. 2001. Springer-Verlag New York. pp. 104-117.
Brassil, Jack et al "Enhancing Internet Streaming Media with Cueing Protocols." Twentieth Annual Joint Conference of the IEEE Computer and Communications Societies. IEEE Press. 2001. vol. 1. 95-103.
McGrath, E. "Digital Insertion of Advertising into a Digital Stream." Broadcasting Convention. 1997. 258-61.
International Search Report, PCT/US03/19774, dated Dec. 18, 2003.
International Search Report, PCT/US03/12873, dated Jul. 14, 2003.
Supplemental European Search Report, EP02725839, dated Nov. 24, 2008.
U.S. Appl. No. 09/893,692, Dec. 23, 2004, Office Action.
U.S. Appl. No. 09/893,692, Sep. 14, 2005, Notice of Allowance.
U.S. Appl. No. 09/893,692, Mar. 28, 2007, Notice of Allowance.
U.S. Appl. No. 10/090,727, May 10, 2005, Office Action.
U.S. Appl. No. 10/090,727, Jan. 3, 2007, Notice of Allowance.
U.S. Appl. No. 10/134,439, Jul. 25, 2005, Office Action.
U.S. Appl. No. 10/134,439, Jun. 12, 2006, Notice of Allowance.
U.S. Appl. No. 10/134,552, Oct. 11, 2005, Office Action.
U.S. Appl. No. 10/134,552, May 24, 2006, Office Action.
U.S. Appl. No. 10/134,552, Aug. 8, 2006, Office Action.
U.S. Appl. No. 10/134,552, Mar. 5, 2007, Office Action.
U.S. Appl. No. 10/134,552, Sep. 11, 2007, Office Action.
U.S. Appl. No. 10/134,552, Apr. 4, 2008, Notice of Allowance.
U.S. Appl. No. 10/157,909, Aug. 9, 2006, Office Action.
U.S. Appl. No. 10/157,909, Jan. 30, 2007, Notice of Allowance.
U.S. Appl. No. 10/157,909, May 25, 2007, Notice of Allowability.
U.S. Appl. No. 10/157,909, Jun. 8, 2007, Notice of Allowability.
U.S. Appl. No. 10/157,909, Sep. 10, 2007, Notice of Allowability.
U.S. Appl. No. 10/183,420, Dec. 13, 2005, Office Action.
U.S. Appl. No. 10/183,420, Jun. 22, 2006, Office Action.
U.S. Appl. No. 10/183,420, Dec. 12, 2006, Office Action.
U.S. Appl. No. 10/183,420, Jun. 28, 2007, Office Action.
U.S. Appl. No. 10/183,420, May 20, 2010, Office Action.
U.S. Appl. No. 10/183,420, Nov. 3, 2010, Office Action.
U.S. Appl. No. 10/183,420, Feb. 15, 2011, Office Action.
U.S. Appl. No. 10/183,420, Jun. 7, 2011, Notice of Allowance.
U.S. Appl. No. 11/549,934, Sep. 4, 2009, Office Action.
U.S. Appl. No. 11/549,934, Apr. 28, 2010, Office Action.
U.S. Appl. No. 11/549,934, Nov. 29, 2010, Notice of Allowance.
U.S. Appl. No. 11/754,661, Jun. 19, 2009, Office Action.
U.S. Appl. No. 11/754,661, Nov. 18, 2009, Notice of Allowance.
U.S. Appl. No. 11/761,050, Jul. 27, 2009, Office Action.
U.S. Appl. No. 11/761,050, Feb. 3, 2010, Office Action.
U.S. Appl. No. 11/761,050, Jul. 6, 2011, Notice of Allowance.
U.S. Appl. No. 11/761,050, Oct. 21, 2011, Notice of Allowance.
U.S. Appl. No. 11/848,430, Aug. 8, 2011, Office Action.
U.S. Appl. No. 11/848,430, Jun. 21, 2012, Notice of Allowance.
U.S. Appl. No. 11/848,430, May 9, 2013, Notice of Allowance.
U.S. Appl. No. 12/732,929, Oct. 7, 2010, Office Action.
U.S. Appl. No. 12/732,929, Mar. 18, 2011, Notice of Allowance.
U.S. Appl. No. 13/053,903, Nov. 28, 2012, Office Action.
U.S. Appl. No. 13/053,903, Apr. 15, 2013, Notice of Allowance.
U.S. Appl. No. 13/173,290, Jan. 3, 2012, Office Action.
U.S. Appl. No. 13/173,290, Mar. 16, 2012, Notice of Allowance.
U.S. Appl. No. 13/227,402, Feb. 10, 2012, Office Action.
U.S. Appl. No. 13/227,402, Aug. 29, 2012, Office Action.
U.S. Appl. No. 13/227,402, Jun. 13, 2013, Office Action.
U.S. Appl. No. 13/227,402, Oct. 28, 2013, Office Action.
U.S. Appl. No. 13/620,547, Aug. 7, 2013, Office Action.
U.S. Appl. No. 13/620,816, Jul. 17, 2013, Office Action.
U.S. Appl. No. 13/620,820, Sep. 12, 2013, Office Action.
U.S. Appl. No. 11/848,430, Aug. 19, 2013, Notice of Allowance.
U.S. Appl. No. 13/620,547, Nov. 15, 2013, Office Action.
U.S. Appl. No. 13/620,818, Jul. 19, 2013, Office Action.
U.S. Appl. No. 13/549,205, filed Jul. 13, 2012, Weigand.
U.S. Appl. No. 13/227,402, Feb. 10, 2014, Notice of Allowance.
U.S. Appl. No. 13/612,834, Apr. 28, 2014, Office Action.
U.S. Appl. No. 13/620,547, Apr. 11, 2014, Notice of Allowance.
U.S. Appl. No. 13/620,041, Feb. 5, 2014, Office Action.

\* cited by examiner

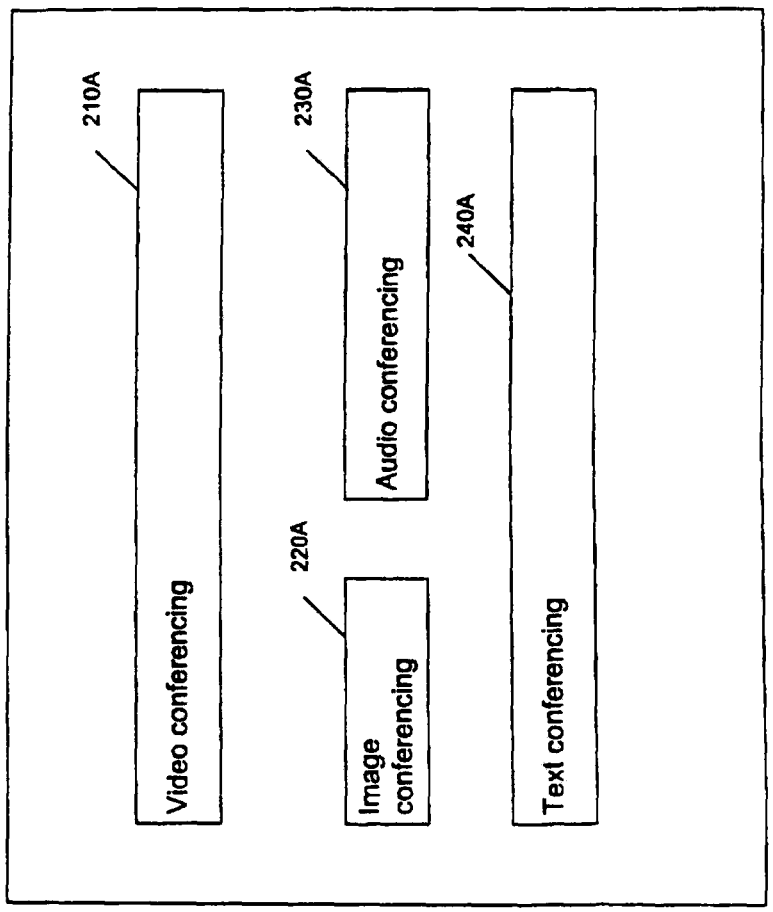

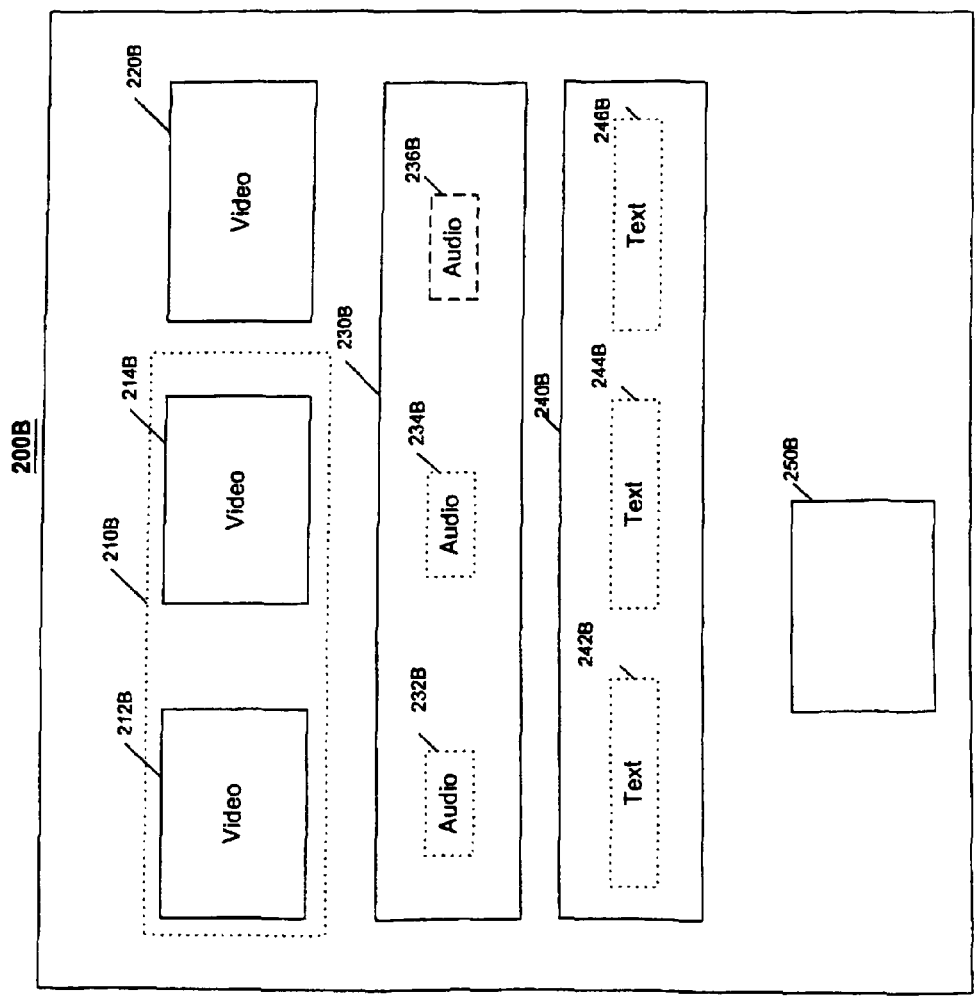

MODIFYING PAYLOADS OF DIGITAL STREAMS FOR DIGITAL CONFERENCING

CROSS-REFERENCE TO RELATED APPLICATIONS

The present application is a continuation of U.S. patent application Ser. No. 13/053,903, filed on Mar. 22, 2011, which is a continuation of U.S. Ser. No. 11/549,934, filed on Oct. 16, 2006 now issued as U.S. Pat. No. 7,921,157, which is a continuation of U.S. application Ser. No. 10/134,439, filed on Apr. 30, 2002 now issued as U.S. Pat. No. 7,124,166, which claims the benefit of and priority to U.S. provisional application No. 60/343,182, filed on Dec. 31, 2001, and U.S. provisional application No. 60/286,964, filed on Apr. 30, 2001. Each of the aforementioned patent(s) and application (s) are hereby incorporated by reference in their entirety.

TECHNICAL FIELD

The following description relates to using switching technologies to stream media in digital conferencing applications.

BACKGROUND

Video conferencing generally describes a process whereby conferencing participants can communicate remotely with one another through the use of video equipment that typically includes some form of camera and a video display. Increased usage of the Internet has resulted in an increased demand for video conferencing and a corresponding need for cost effective multimedia communications solutions.

SUMMARY

In one general aspect, data units may be transmitted by using a switch to receive from at least two conferencing participants a stream of data units that each include a payload portion and an attribute portion. The switch duplicates at least a subportion of the payload portion of a data unit within the stream of data units, and enables access to the duplicated subportion of the data unit by two or more conferencing participants.

In another general aspect, a conferencing participant may participate in an electronic conference by interfacing with a network that includes a switch that duplicates the stream of data units sent by two or more conferencing participants and makes the duplicated stream of data units accessible to more than one conferencing participant. The streams are received from the switch, with each stream including a payload portion that has been duplicated by the switch and an attribute portion that has been transmitted by more than one other conferencing participant.

In another general aspect, a conferencing participant participates in an electronic conference by interfacing with a network that includes one or more switches capable of duplicating at least a payload portion of a data unit within a stream of data units. The conferencing participant transmits the stream of data units to the switches for duplication of at least the payload portion for transmission to two or more conferencing participants.

In another general aspect, a conferencing participant participates in an electronic conference by interfacing with a network that includes a switch capable of duplicating a stream. The participant transmits a stream to the switch and receives duplicated streams from the switch.

Implementations may include one or more of the following features. For example, the data unit may include an Internet Protocol packet. The attribute portion of the data unit may include an Internet Protocol header, or one or more pieces of layer three information.

Implementations may include using the switch to generate and associate different attribute portions with duplicates of the payload portion generated by the switch. Using the switch to duplicate at least the payload portion may include duplicating only the payload portion of the data unit. Using the switch to associate different attribute portions with the data unit and duplicates of the payload portion may include specifying destination information that differs among the duplicates of the payload portion. Using the switch to generate and associate different attribute portions may include changing an IP destination address. Changing the IP destination address may include changing the IP destination address to an IP address corresponding to one or more conferencing participants to which access to the payload portion will be enabled.

Using the switch to duplicate may include using the switch to duplicate the payload portion and the attribute portion. The switch may enable the conferencing participants to access duplicated subportions of data units in response to receiving a request to access the stream of data units. The request may be received from at least a requesting one of the two or more conferencing participants, or from a device other than the conferencing participants.

Using the switch to enable access to the duplicated subportions of the data unit may include transmitting two or more duplicated subportions to two or more conferencing participants using the switch. Using the switch to enable access to the duplicated subportions of the data unit by two or more conferencing participants may include transmitting two or more duplicated subportions from a transmitting participant to all of the conferencing participants using the switch, or from all of the conferencing participants to all of the conferencing participants using the switch. Transmitting two or more duplicated subportions from all of the conferencing participants to all of the conferencing participants may include enabling the switch to filter an originating stream so that a stream of data units from an originating conferencing participant is not transmitted back to the originating conferencing participant.

Implementations may include partitioning content from a stream that includes a combination of a forwarded signal and a filtered signal. The forwarded signal may differ from the filtered signal. For example, the underlying media format may be transcoded to a different bit rate.

Implementations may include determining whether one of the conferencing participants is attempting to actively participate. Using the switch to enable access to the duplicated subportions of the data unit by two or more conferencing participants may include enabling access to the streams of the conferencing participants attempting to actively participate most recently. The streams of conferencing participants that have not attempted to actively participate may not be duplicated.

Using the switch to enable access to the duplicated subportions may include prioritizing conferencing participants to determine which streams of the conferencing participants are duplicated. Access to the streams of conferencing participants with higher priorities may be enabled before enabling access to the data streams of conferencing participants with lower priorities. A priority for a participant may be specified by one of a service provider, a conference organizer, or a conference manager.

Using a switch to enable access to the duplicated subportion of the data unit by two or more conferencing participants may include using the conference manager to designate which of the conferencing participants' data streams are enabled to be accessed. Perceivable output may be displayed based on the stream of data units.

The details of one or more implementations are set forth in the accompanying drawings and the descriptions below. Other features and advantages will be apparent from the description and drawings, and from the claims.

DESCRIPTION OF DRAWINGS

FIG. 2A is a block diagram illustrating several conferencing applications that may be available to an exemplary conferencing participant.

FIG. 2B is a block diagram illustrating an exemplary display used to make known and/or available the conferencing applications described with respect to FIG. 2A.

Like reference symbols in the various drawings indicate like elements.

DETAILED DESCRIPTION

In general, switching technologies may be used to duplicate packets in a digital conference (e.g., digital video stream) sent from one workstation as part of an electronic conference. The switching technologies enable the multiple streams sent from the switch to the recipient workstations to be generated from a single digital stream sent from the sending workstation to the switch. Thus, a terminal participating in the conference does not need to transmit a stream for each participant.

Figure 1:
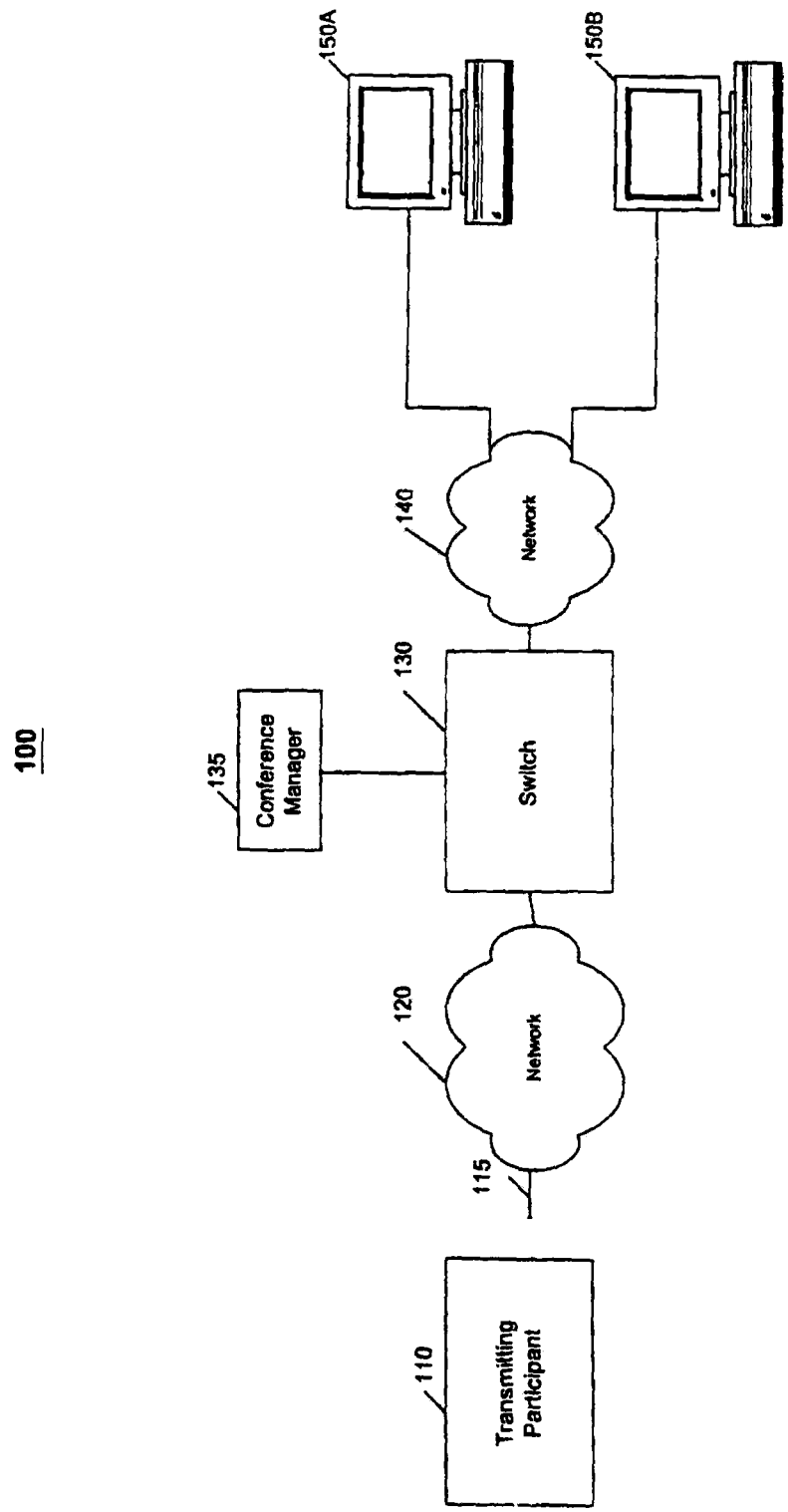
FIG. 1 is a block diagram illustrating a communications system that uses a switch to duplicate digital streams and enable digital conferencing among multiple conferencing participants.
Figure 3:
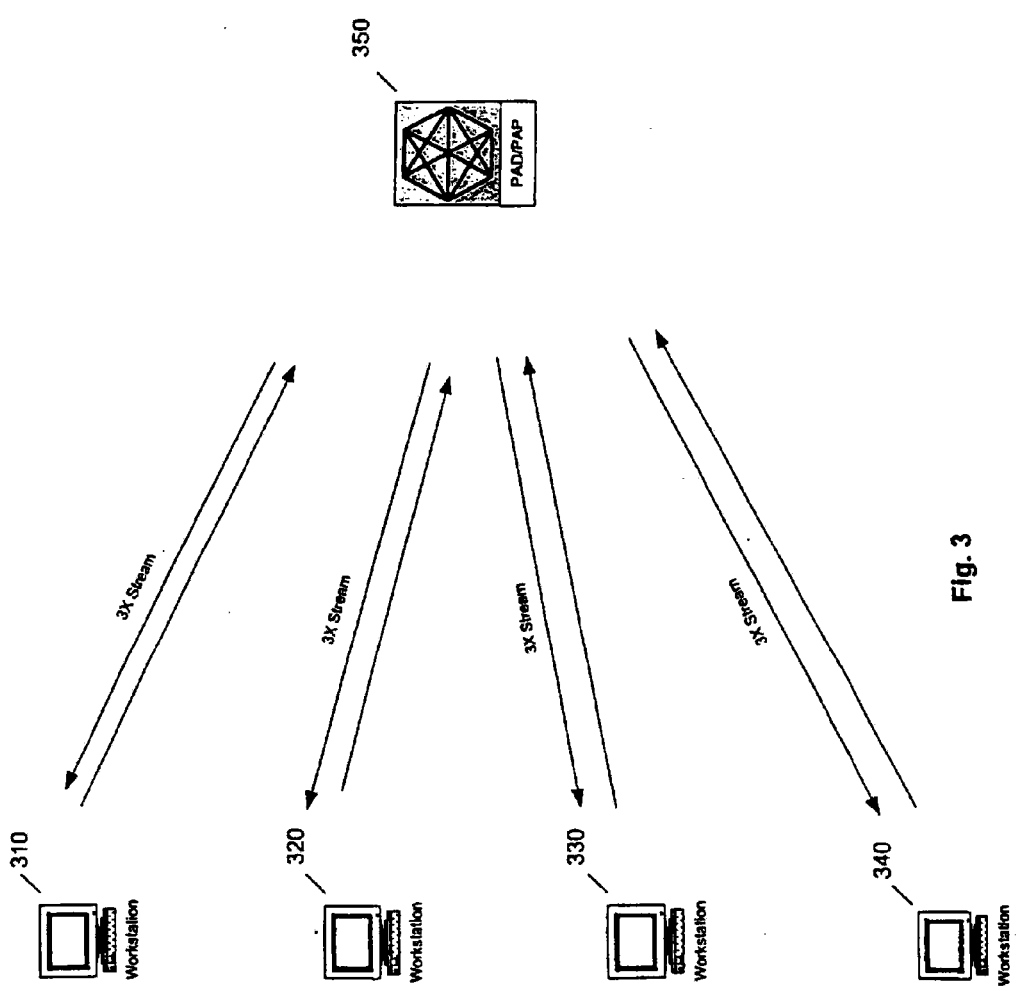
FIG. 3 is a diagram of a switch interfacing with four conferencing participants.
Figure 4:
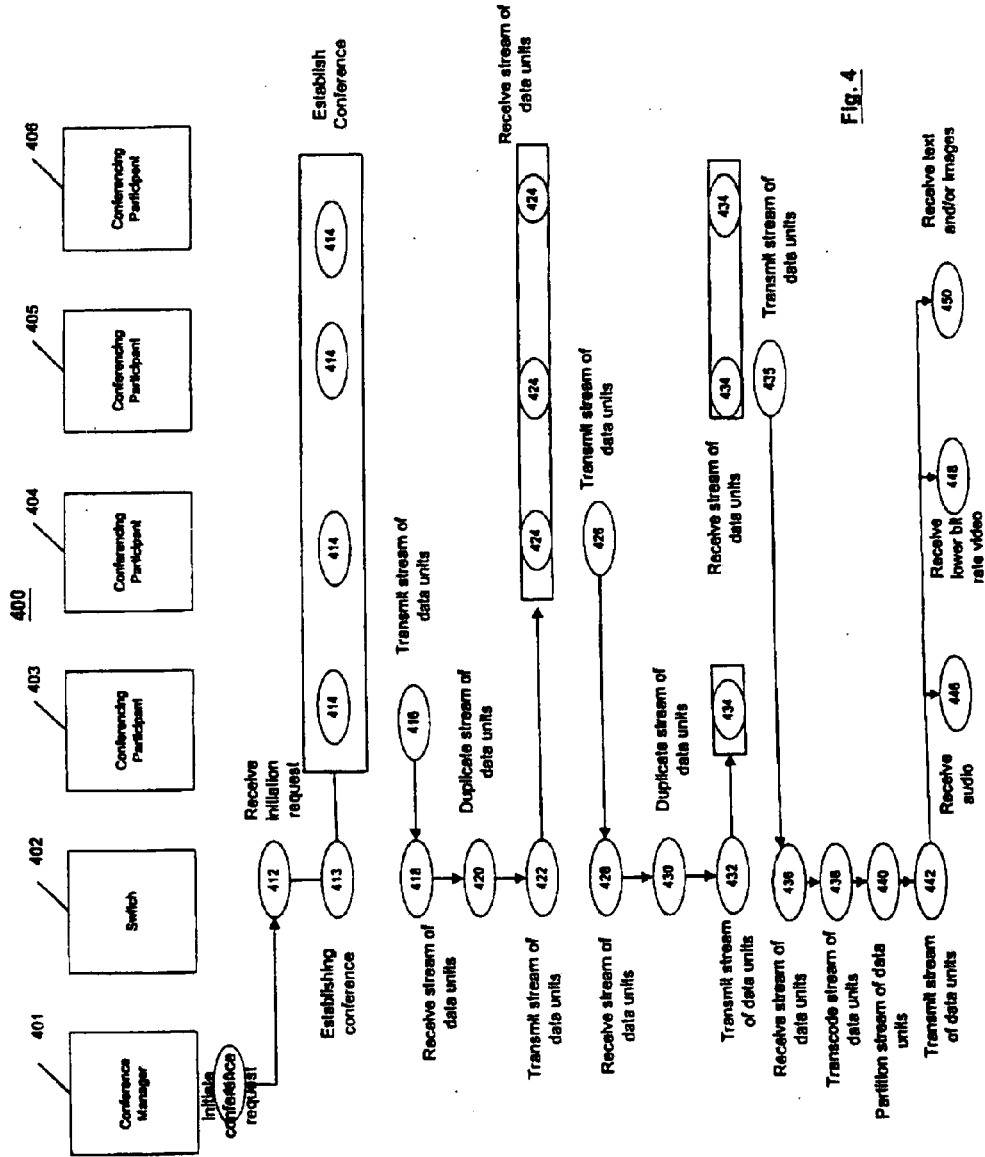
FIG. 4 is a flow chart illustrating the operation of a switch in duplicating at least a subportion of a data unit in a stream of data units and enabling conferencing participants to access the duplicated subportion of the stream of data units.
Figure 5:
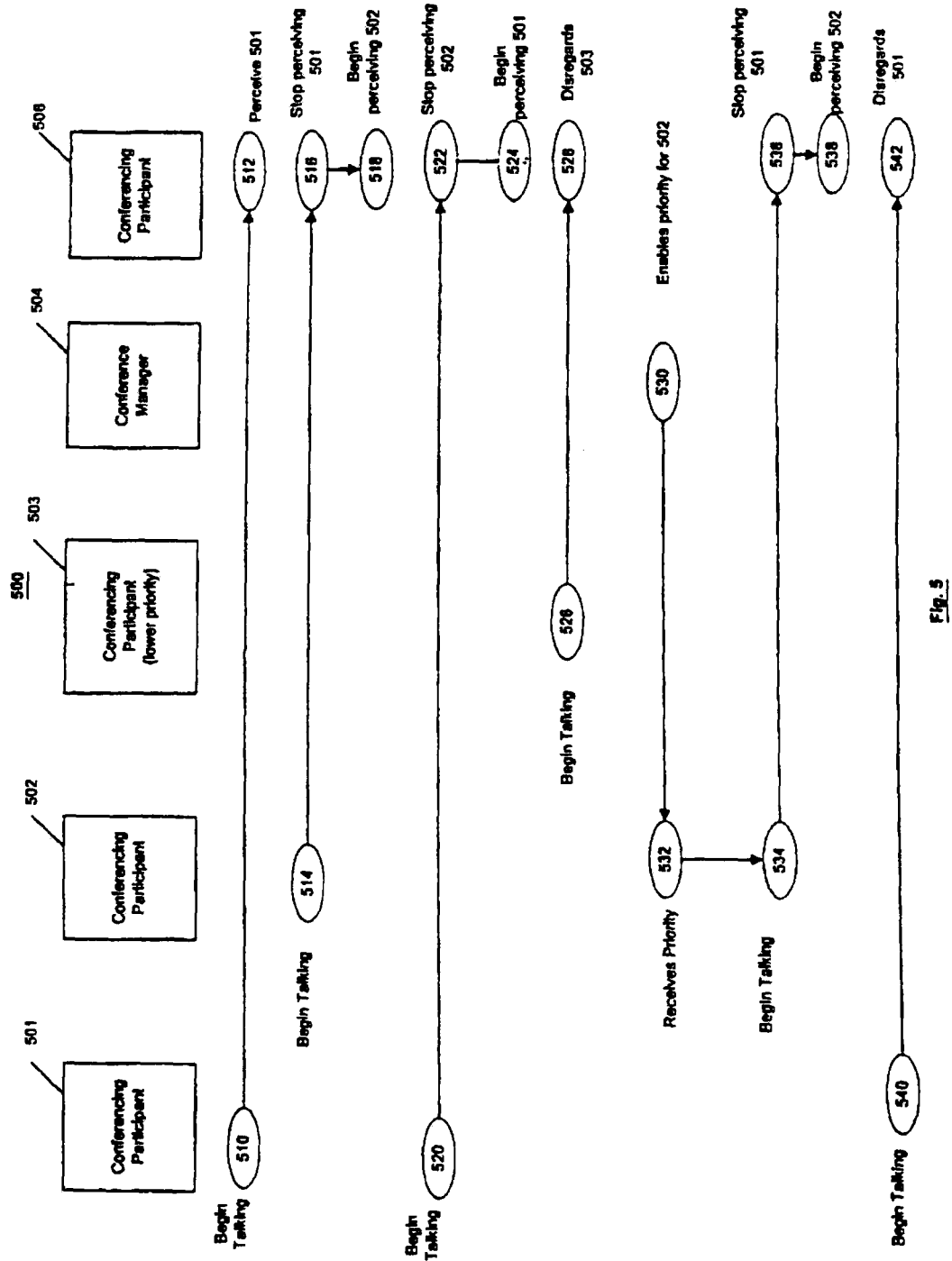
FIG. 5 is a diagram illustrating the operation of a conferencing participant in prioritizing among several duplicated streams of data units for display.

By way of introduction, FIGS. 1-3 illustrate aspects of a communications system that uses switching techniques to duplicate digital streams to enable conferencing between multiple participants. For brevity, in FIGS. 1-3, several elements are represented as monolithic entities. However, as would be understood by one skilled in the art, these elements each may include numerous interconnected computers and components configured to perform a set of specified operations and/or dedicated to a particular geographical region. FIGS. 4 and 5 illustrate aspects of a communications system that may or may not correspond to the logical and/or physical aspects described with respect to FIGS. 1-3.

Referring to FIG. 1, a communications system 100 that is capable of providing conferencing between multiple participants may be structured and arranged to include two or more conferencing participants 150A and 150B and communication software and hardware that enables communications between them. More particularly, the communications system 100 may include a transmitting participant 110 (optional), a network 120, a switch 130, a conference manager 135 (optional), a network 140, and conferencing participants 150A and 150B. A conferencing participant 150A generally transmits one or more streamed data units across network 120 to one or more switches 130 that duplicate the data units or portions of the data units and transmit the duplicated data units or portions to the two or more conferencing participants 150A and 150B through network 140.

A transmitting participant 110 typically includes a computer system that converts a media feed into a stream. Transmitting participant 110 may be structured and arranged to convert the media source (e.g., a video or audio feed) into data units for transmission across a network 120. The transmitting participant 110 may include a general-purpose computer having a central processor unit (CPU) and memory/storage devices that store data and various programs such as an operating system and one or more application programs. Other examples of a transmitting participant 110 include a workstation, a server, a device, a special purpose device or component, a broadcast system, other equipment, or some combination thereof capable of responding to and executing instructions in a defined manner. The transmitting participant 110 also typically includes an input/output (I/O) device (e.g., one or more devices having a video and/or audio input and conversion capability), and peripheral equipment such as a communications card or device (e.g., a modem or a network adapter) for exchanging data with the network 120.

A communications link 115 is used to communicate data between the transmitting participant 110 and the network 120. Communications link 115 may include, for example, a telephone line, a wireless network link, a cable network, or a direct connection.

The network 120 typically includes hardware and/or software capable of enabling direct or indirect communications between the transmitting participant 110 and the switch 130. The network 120 may include a direct link between the transmitting participant 110 and the switch 130, or it may include one or more networks or subnetworks between them (not explicitly shown). Each network or subnetwork may include, for example, a wired or wireless data pathway capable of carrying and receiving data. Examples of network 120 include the Internet, the World Wide Web, a WAN ("Wide Area Network"), a LAN ("Local Area Network"), an analog or a digital wired or wireless telephone network (e.g., a PSTN ("Public Switched Telephone Network"), an ISDN ("Integrated Services Digital Network"), or a xDSL ("any form of Digital Subscriber Loop")), and/or a radio network, a television network, a cable network, a satellite network, or some other delivery mechanism for carrying data.

The switch 130 typically is structured and arranged to receive streams of data units (e.g., from the transmitting participant 110 and the conferencing participants 150A and 150B), to duplicate the stream of data units, and to transmit the duplicated streams to two or more conferencing participants 150A and 150B.

In some implementations, the switch 130 is structured and arranged to perform filtering and forwarding between different domains at the same level of the protocol stack in the OSI ("Open System Interconnection") reference model. For example, in some networks, switch 130 may forward Ethernet frames between different Ethernet segments. In another example, switch 130 may forward IP packets between different IP subnets.

Generally, switch 130 includes a device that performs network operations and functions in hardware (e.g., a chip or a part of chip). In some implementations, the device may include an ASIC ("Application Specific Integrated Circuit") that implements network operations logic directly on a chip (e.g., logical gates fabricated on a silicon wafer then manufactured into a chip). For example, an ASIC chip may implement a logical gate structure in silicon to perform filtering by receiving a packet, examining the IP address of the received packet, and filtering based on the IP address.

Implementations of the device included in the switch 130 may use a Field Programmable Gate Array (FPGA). A FPGA is generally defined as including a chip or chips fabricated to allow third party designers to implement a variety of logical designs on the chip. For example, a third party designer may load a design within a FPGA to replace the received IP addresses with different IP addresses, or may load a design within the FPGA to segment and reassemble IP packets as they are modified while being transmitted through different networks.

Implementations of the device included in the switch 130 may include a network processor. A network processor generally is defined to include a chip or chips for allowing software to specify network operations to be performed. A network processor may perform a variety of operations. One example of a network processor may include several interconnected RISC ("Reduced Instruction Set Computer") processors fabricated in a network processor chip. The network processor chip may implement software on some of the RISC processors to change an IP address of an IP packet. Other RISC processors in the network processor chip may implement software that determines which conferencing participants are receiving an IP stream.

Although various examples of network operations were defined with respect to different devices, each of the devices may to be programmable and capable of performing the operations of the other devices. For example, the FPGA device is described as the device used to replace IP addresses and segment and reassemble packets; however, a network processor and ASIC are generally capable of performing the same operations.

Data units handled by switch 130 may be accessed by or sent to conferencing participants 150A and 150B through network 140. As such, network 140 is structured and arranged to receive data units transmitted from the switch 130 for transmission to the conferencing participants 150.

The conference manager 135 may include one or more devices capable of enabling an electronic conference of two or more conferencing participants. The conference manager 135 may include a controller (not shown) that processes instructions received from or generated by a software application, a program, a piece of code, a device, a computer, a computer system, or a combination thereof, to direct operations of the conference manager 135. The instructions may be embodied permanently or temporarily in any type of machine, component, equipment, storage medium, or propagated signal that is capable of being delivered to the conference manager 135 or that may reside with the controller at the conference manager 135. The conference manager 135 may include a general-purpose computer (e.g., a personal computer) capable of responding to and executing instructions in a defined manner, a system or a component in the switch 130, other equipment, or some combination of these items that is capable of responding to and executing instructions.

For instance, in one implementation, the conference manager 135 includes one or more scheduling, management, and authentication applications (e.g., calendaring software) capable of establishing and managing one or more electronic conferences. These scheduling and authentication applications may run on a general purpose operating system and a hardware platform that includes a general purpose processor and specialized hardware for graphics, communications and/or other capabilities. In another implementation, conference manager 135 may include a switch designation component (e.g., a server or program) that determines the switch 130 with which the conferencing participants will be communicating. For example, the conference manager 135 may be structured and arranged to communicate to the conferencing participants which specific switch will host the conference (e.g., duplicate and transmit the streams of data units), or to communicate to the designated switch the required information and authorization to host the conference.

Implementations of the conference manager 135 may include a service provider or a conference organizer. For example, a service provider may offer conferencing services and arrange or set up conferences. In another example, a conference organizer (e.g., a user putting together an electronic conference) may act both as a conference manager 135 and a conferencing participant 150B.

The network 140 may include hardware and/or software capable of enabling direct or indirect communications between the switch 130 and the conferencing participant 150. As such, the network 140 may include a direct link between the switch 130 and the conferencing participant 150, or it may include one or more networks or subnetworks between them (not shown). Each network or subnetwork may include, for example, a wired or wireless data pathway capable of carrying and receiving data. Examples of the delivery network include the Internet, the World Wide Web, WANs, LANs, analog or digital wired and wireless telephone networks (e.g., PSTN, ISDN, or xDSL), radio, television, cable, satellite, and/or any other delivery mechanism for carrying data. Network 120 and network 140 may share one or more hardware or software devices.

Conferencing participants 150A and 150B may include one or more devices capable of receiving the streams of data units transmitted by switch 130 through network 140. The conferencing participant 150A may include a controller (not shown) that processes instructions received from or generated by a software application, a program, a piece of code, a device, a computer, a computer system, or a combination thereof, to direct operations of the conferencing participant 150A. The instructions may be embodied permanently or temporarily in any type of machine, component, equipment, storage medium, or propagated signal that is capable of being delivered to the conferencing participant 150A or that may reside with the controller at the conferencing participant 150. The conferencing participant 150 may include a general-purpose computer (e.g., a personal computer) capable of responding to and executing instructions in a defined manner, a workstation, a laptop, a PDA ("Personal Digital Assistant"), a wireless phone, a component, other equipment, or some combination of these items that is capable of responding to and executing instructions.

For instance, in one implementation, the conferencing participant 150A includes one or more information retrieval software applications (e.g., a browser, a mail application, an instant messaging client, an Internet service provider client, or an AOL TV or other integrated client) capable of receiving one or more data units. The information retrieval applications may run on a general purpose operating system and a hardware platform that includes a general purpose processor and specialized hardware for graphics, communications and/or other capabilities. In another implementation, conferencing participant 150A may include a wireless telephone running a micro-browser application on a reduced operating system with general purpose and specialized hardware capable of operating in mobile environments.

Generally, conferencing participant 150A participates in an electronic conference by transmitting and receiving streams of data units. However, implementations may include having conferencing participants 150A participate in an asynchronous mode. For example, an electronic conference may incorporate a news feed that is being discussed and transmitted by a transmitting participant. In another example, a briefing may be incorporated into an electronic conference to enable wider participation. Other asynchronous modes may include conferencing participants that receive but do not transmit. For these and other reasons, aspects of the transmitting participant 110 may resemble, but are not limited to, aspects of the conferencing participant 150A.

Conferencing participant 150B may include a workstation that is identical to conferencing participant 150A, or conferencing participant 150B may include a device that differs from conferencing participant 150A. For example, conferencing participant 150A may include a PDA while conferencing participant 150B includes a workstation.

In another implementation, the conferencing participants 150A and 150B may have different input/output capabilities. For example, one conferencing participant 150A may not have a camera from which to generate video content. This may limit the conferencing participant 150A to only sending an audio stream of data units. In another implementation, the conferencing participant 150A may have limited graphical display capabilities (e.g., the conferencing participant may be a PDA). The conferencing participant 150A may receive text messages exchanged as part of the electronic conference without receiving video content.

FIG. 2A illustrates conferencing applications 200A that are available to an exemplary conferencing participant, such as the conferencing participant 150A described in FIG. 1. The applications depicted include video conferencing application 210A, image conferencing application 220A, audio conferencing application 230A, and text conferencing application 240A.

In general, the conferencing applications 200A are logically organized from the top of the diagram down based on the resources required by those applications. For example, video conferencing applications 210A generally require more bandwidth than text conferencing applications 240A. Similarly, the computational resources required by the image and audio compression techniques to compress, decompress and/or display media generally decrease from video conferencing applications 210A to image conferencing applications 220A to audio conferencing applications 230A to text conferencing applications 240A. The resources required for one or more applications may lead one or more conferencing participants to participate in a less resource-intensive manner.

Typically, video conferencing application 210A encodes and displays audio and video content. Implementations of video conferencing application 210A use compression to reduce the bandwidth consumed by transmitting the stream of data units. For example, video conferencing protocols and techniques may reduce the resolution, detail, or frame rate to reduce the bandwidth consumed. In another example, the frame-to-frame differences may be encoded for transmission instead of encoding each frame. Similar techniques may be applied to the audio signal. For example, the sampling rate of the audio signal may be reduced or the signal may be compressed.

Image conferencing application 220A typically operates by displaying one or more images to conferencing participants. Although an image conferencing application may resemble, in some implementations, a video conferencing application 210A with a low frame rate, image conferencing application 220A typically has non-video implementations. For example, a conferencing participant may input a map into an electronic conference in which aspects of the map are discussed. Other implementations may include inputting a web page and/or a slide show for incorporation into the electronic conference. In an implementation that resembles video conferencing application 210A, an image of the conferencing participant may be displayed in an audio conference when that conferencing participant is speaking.

Audio conferencing application 230A involves the use of an audio signal (e.g., a stream of data units) for incorporation into an electronic conference. Typically, aspects of the audio conferencing application may resemble aspects of the audio signal in a video conferencing application 210A discussed above in that the signal may be compressed.

Text conferencing application 240A involves the exchange of text in an electronic conference. One common form of exchanging text may feature the use of "chat" (e.g., a "chat room"). Other text exchanging applications may include electronic mail, instant messaging, SMS ("Short Message Service"), and proprietary applications. Although some of the text exchanging applications may not commonly appear as text conferencing applications 240A, implementations may include using an underlying text exchanging application as a transport mechanism in the conferencing application. For example, an electronic conference may use electronic mail to exchange text messages between conferencing participants. In another example, when one conferencing participant receives an instant message from another conferencing participant, the instant message may be incorporated into the electronic conference.

FIG. 2B illustrates one implementation for user environment 200B that indicates how several of the applications described with respect to FIG. 2A may be collectively integrated into and form one or more electronic conferencing applications. Typically, user environment 200B operates on a computer system, such as the conferencing participant 150A described with respect to FIG. 1. User environment 200B may be structured and arranged to incorporate video, images, text and audio as part of an electronic conference as well as to share a common application or white board. Specifically, user environment 200B includes video application 210B, image application 220B, audio conferencing application 230B, text conferencing application 240B, and shared application 250B.

Typically, video application 210B features the display of two other conferencing participants. In one implementation, each conferencing participant has related text and audio conferencing applications, and the first conferencing participant may be represented by a video conferencing application 212B, an audio conferencing application 232B, and a text conferencing application 242B. The second conferencing participant communicates with a video application 214B, an audio conferencing application 234B, and a text conferencing application 244B. A third conferencing participant without video conferencing capability may communicate using an imaging application 220B, an audio conferencing application 236B, and a text conferencing application 246B.

The audio conferencing application 230B depicts an implementation reflecting both common audio properties as well as properties specific to their originating sources. More precisely, general audio sources generated simultaneously may cause destructive interference that make them difficult to understand. For this reason, the audio channel may be structured so that one audio channel is broadcast at a time. For example, implementations may commonly manage all audio conferencing applications and apply the same operating instructions to all received audio signals. In one example, receiving several different audio sources simultaneously may cause user confusion or comprehension difficulties that may be avoided through the application of filtering criteria generic to several users. Alternatively, it may be desirable to provide source-specific operating and/or filtering instructions. For example, where the different audio signals are received at different strengths, the conferencing participant may wish to reduce the volume from one conferencing participant and increase the volume from another conferencing participant. In another implementation, a conferencing participant may wish to listen to everything from the conferencing participant in the audio conferencing application 232B and "mute" or suppress the audio conferencing application 234B. Each function may be enabled through filtering controls displayed in user environment 200B.

A text conferencing application 240B may be a common application to all participants (as represented by the application appearing across the breadth of participants) or may be specific to conferencing participants (as represented by text conferencing applications 242B, 244B, and 246B. In one implementation of text conferencing as a common application to all participants, when a conferencing participant enters a message to be communicated, the participant's identification may appear next to the message. In implementations of conferencing participant-specific text conferencing, the message may be displayed in association with its source (e.g., underneath the corresponding participant).

FIG. 3 illustrates the operation of a switch in interfacing with four conferencing participants to duplicate a stream of data units. Conferencing participants 310, 320, 330 and 340 each generally correspond to the conferencing participants described with respect to FIGS. 1 and 2B, and switch 350 generally corresponds to the switch 130 described with respect to FIG. 1.

Each of conferencing participant 310, 320, 330, and 340 transmits one stream of data units to the switch 350 for duplication, and receives the duplicated streams of the other participants in return from the switch 350. When each conferencing participant receives the stream of data units of all the other conferencing participants, the total number of streams sent out by the switch is 2(N-1), where N is the number of conferencing participants (i.e., the switch sends out six streams when there are four participants). Although FIG. 3 illustrates having each conferencing participant receive the stream of every other conferencing participant, some implementations, particularly those having a large number of conferencing participants, may use intelligent selection and filtering techniques to reduce the number of streams that are transmitted to each participant.

Furthermore, although one switch is depicted, implementations may include using more than one switch. For example, several users may initiate an electronic conference at one switch. However, as additional users join the electronic conference, additional switches may be added to support the electronic conference. More specifically, in one implementation, a first switch with limited available capacity may initiate a connection to a second switch and send all new connections to the second switch. Initiating the connection to the second switch may include exchanging duplicated data units between the first and second switches. In another example, when the second switch is activated, several users may be transferred to the second switch to be hosted. Implementations also may include intelligent switch selection criteria that activate use of a second switch. For example, when the switch determines that several users are located in the same proximity, the switch may activate an additional switch that is closer to the users to host the conference so that duplicated streams are not being transmitted across large portions of the network.

FIG. 4 illustrates the operation of a communications system that uses a switch to duplicate at least a subportion of a stream of data units and enable conferencing participants to access the duplicated subportion of the stream of data units. The communications system includes a conference manager 401, a switch 402, and several conferencing participants 403-406.

The conference manager 401 generally initiates the conference (step 410) by, for instance, determining the identity of a switch to host the conference and enabling the switch to host the conference for two or more terminals. The conference may be initiated in response to a request from a conferencing participant to host the conference. The conference may be initiated by allocating switch resources and authenticating conferencing participants. Allocating switch resources may include load balancing conferencing participants among more than one switch to reduce network/switch congestion. Conferencing participants seeking to join an electronic conference being hosted on a switch may be authenticated to ensure conference confidentiality through a login process or through a more elaborate set of steps, such as the exchanging of public and/or private keys.

The request to initiate the conference is received by switch 402 (step 412), which also may verify and authenticate the message (not shown). In response to the request, the switch 402 establishes the conference (step 413). Although the conference is established in response to a request from a conference manager, in some configurations, the conference manager may reside on a conferencing participant. In any event, the switch 402 establishes a conference with conferencing participants 403-406 (step 414). Establishing the connection generally enables a conferencing participant to communicate a stream of data units to other conferencing participants through the switch 402 and to receive streams of data units from one or more other conferencing participants through the switch 402.

Terminal 403 transmits a stream of data units (step 416) that is received by the switch 402 (step 418). The switch duplicates the stream of data units (step 420). In general, duplicating the stream of data units includes receiving a data unit, identifying a payload portion within the data unit, enabling an instance of the payload to be modified for subsequent transmission, and adding header information to the data unit to reflect addressing information corresponding to one or more recipients (e.g., conferencing participants 403-406). The stream may be duplicated by copying the payload (e.g., content) of an IP packet and changing the header information to reflect the IP address of the destination conferencing participants for the payload, by storing one or more IP packets for modification (e.g., the IP packet may be stored), by loading the packet to memory and changing the IP destination address while preserving other parameters in the header, or by other techniques. Operations may be performed on the payload before transmitting the payload to a conferencing participant. For example, the switch may transcode the content of the payload to reduce the bit rate of the stream. Generally, transcoding involves modifying a compressed signal so that the characteristics of the modified signal correspond to specified criteria. For example, a high bit rate video signal may be transcoded by having the compressed video signal expanded, and recompressed at a higher compression ratio before transmitting the recompressed signal to a conferencing participant.

Another operation that may be performed includes partitioning a combined signal to extract a forwarded signal and remove a filtered signal. For example, a switch may remove an audio signal from a combined audio-visual signal to reduce the bandwidth required to transmit the forwarded signal.

Although FIG. 4 illustrates having terminals 403-406 receive a transcoded and partitioned stream in steps 440-450, the diversity of partitioning techniques is intended to demonstrate that various forms of partitioning are available rather than how a conferencing participant would likely transition between different conferencing applications. For example, a terminal that is capable of receiving higher rate video applications would not likely request to "downgrade" the received signal and received text instead. Similarly, a conferencing participant capable of receiving video generally would not elect to receive audio or lower rate video instead.

In any event, regardless of the operations used during duplication of the payload portion, the switch 402 ultimately transmits the duplicated streams to conferencing participants 404-406 (step 422), and the conferencing participants 404-406 ultimately receive the stream of data units (step 424).

As part of participating in the electronic conference, terminal 404 transmits a stream of data units (step 426). The switch 402 receives (step 428) and duplicates (step 430) the stream of data units, and then transmits (step 432) the duplicated streams of data units which are received (step 434) by the conferencing participants 403, 405 and 406.

As the third participant to transmit in an electronic conference, terminal 405 transmits a stream of data units (step 435) that are received (step 436) by switch 402. The switch 402 performs operations on the data units. First, the switch 402 transcodes the data units (step 438). Typically, transcoding the data units involves modifying the content portion or underlying media format of a data unit to give the stream of data units a desired characteristic. For example, lower quality video may be decompressed and recompressed at a higher data rate with more detail and resolution. In another example, the data rate may be reduced by reducing the number of frames, and resolution, and/or by using a lossier compression algorithm.

Next the switch 402 extracts or partitions content from within the stream of data units (step 440) by, for example, filtering a signal from a stream of data units whose content combines more than one type of media (e.g., another signal). In this manner, an audio signal may be extracted from a composite audio-video signal.

Although FIG. 4 depicts transcoding as occurring before partitioning, implementations may include performing those and other steps in reverse order or simultaneously, or combining them with other steps. For example, a stream of data units may have the content of the received stream of data units expanded, and then may extract the audio signal from the expanded stream.

The stream of data units is transmitted to terminals 403, 404, and 406 (step 442) in one or several formats. Additionally, the transmitted data units may be received in various formats based on the terminal to which they are transmitted. For instance, terminal 403 may receive or filter an audio stream of data units where the audio portion of a video signal has been partitioned (step 446), terminal 404 may receive or filter a lower bit rate video that has been transcoded (step 448), and terminal 406 may receive or filter text that has been partitioned and an image that has been transcoded from the underlying stream of data units (step 450).

Although a conferencing participant may receive output streams of data units from several sources concurrently (e.g., using several displays on one or more display devices), the conferencing participant may selectively receive and/or display a subset of the multiple streams at any given instant. For example, limited bandwidth to the conferencing participant may constrain the number of simultaneous connections, or comprehension issues may undermine the advantages otherwise obtained by receiving more than one stream at a time. In an example of seven conferencing participants, it may be advantageous to transmit data streams from only four of the seven conferencing participants to the conferencing participant to avoid bandwidth constraints or to avoid confusing the recipient conferencing participant.

It may therefore become necessary to prioritize among several competing or simultaneous data streams. For example, access to the streams of data units may be limited to the conference manager's stream and also those of the three most recent "active" participants. A conferencing participant may be considered "active" when the participant attempts to transmit during the electronic conference by, for instance, speaking into a microphone, moving while on camera, or typing text in a chat window.

FIG. 5 illustrates prioritization in an electronic conferencing system that includes conferencing participants 501-503, a conference manager 504, and a conferencing participant 508. Conferencing participants 501-503 each transmit streams of data units concurrently, while conferencing participant 508 determines which of the streams of data units to "watch" or otherwise perceive.

In this example, conferencing participant 501 is talking initially (step 510). In response, conferencing participant 508 perceives conferencing participant 501 (step 512).

If, in the course of the electronic conference, conferencing participant 502 begins talking (step 514), conferencing participant 508 stops perceiving conferencing participant 501 (step 516) and begins perceiving conferencing participant 502 (step 518). When conferencing participant 501 begins talking again (step 520), conferencing participant 508 stops perceiving conferencing participant 502 (step 522) and begins perceiving conferencing participant 501 (step 524) due to the fact that there is a new "active" participant.

When a conferencing participant 503 is designated as having a lower priority than the conference participant currently being broadcast/perceived, other conferencing participants disregard communications by that conferencing participant, as illustrated by conferencing participant 508 disregarding communications by conferencing participant 503 while higher-priority conferencing participant 501 is being perceived (steps 526 and 528).

Participant prioritization may be implemented by network-centric techniques or by conferencing participant-centric techniques. For example, in a network-centric prioritization, the switch may assign users different priorities designated by, for example, conference manager 504. This prioritization may be forwarded by a conferencing participant to the switch, which will selectively duplicate and enable access to (e.g., transmit) subportions of the stream of data units. If conflicts exist in priorities, the conference organizer's priorities may take precedence.

In a participant-centric technique, the receiving device may determine which streams of data units the switches should filter out. For example, the conferencing participant may elect to always receive the stream of data units of a specified conferencing participant. In yet another example, the conferencing participant may receive filtering or prioritization parameters from a conference manager 504.

To illustrate prioritization based at the conference manager 504, the conference manager 504 enables priority for conferencing participant 502 when conferencing participant 501 is transmitting (step 530). Conferencing participant 502 receives the priority to transmit and have its stream duplicated before other conferencing participants (step 532). In one implementation, the switch may receive a prioritization message and selectively duplicate streams, or may forward the prioritization message to conferencing participants to allow the participants to selectively filter signals. In another implementation, the conference manager 504 may direct a prioritization message to conferencing participants without using the switch to replicate the message. In yet another example, the conference manager 504 may contact the transmitting conferencing participant (e.g., conferencing participant 501) and direct that participant to stop transmitting.

Regardless of the prioritization systems used, conferencing participant 502 begins talking (step 534). In response, conferencing participant 508 stops perceiving conferencing participant 501 (step 536) and starts perceiving conferencing participant 502 (step 538). Even though conferencing participant 502 receives a priority designation, conferencing participant 501 begins talking (step 540). However, because conferencing participant 502 has been designated to be a higher priority than conferencing participant 501, conferencing participant 508 disregards conferencing participant 501 (step 542).

Other implementations are within the scope of the following claims. In particular, in some implementations, the switch may perform one or more of the functions performed by the conference manager. The switch, conferencing participants, and networks also may be distributed across different entities in the communications system and may make use of one or more agents and/or proxies to perform certain functions. For example, the switch may receive a forwarded list of conferencing requirements from a server that arranges electronic conferences to be hosted on one or more switches.

In one example, the conference may be launched by existing applications. For example, a user may be participating in a chat room. One of the users may propose a chat by entering a URL ("Uniform Resource Locator") that is launched by the users clicking on the URL. For example, the URL may contain a hyperlink to conference ID#10 on duplicating switch on IP address A.B.C.D. Launching the URL 'connects' the terminal to the duplicating switch. Upon receiving the URL request from the terminal, the duplicating switch may then look up ID#10 and determine that stream IDs 10-14 are associated with ID#10 and transmit those streams to the requesting terminal. The duplicating switch also may receive stream ID 15 from the requesting terminal and send stream ID 15 to other participants in conference ID#10.

What is claimed is:

1. A method comprising:
   receiving a first data unit from a first conference terminal, the first data unit comprising a payload portion and a first attribute portion;
   modifying, by at least one processor, a content of the payload portion of the first data unit to generate a modified payload portion, wherein modifying the content of the payload portion of the first data unit to generate the modified payload portion comprises removing a video signal or an audio signal from the payload portion of the first data unit;
   duplicating the payload portion of the data unit;
   associating a second attribute portion with the duplicated payload portion to generate a second data unit;
   associating a third attribute data portion with the modified payload portion to generate a third data unit;
   sending the second data unit to a second conference terminal; and
   sending the third data unit to a third conference terminal.

2. The method as recited in claim 1, wherein the modified payload portion comprises text content.

3. The method as recited in claim 1, further comprising:
   determining one or more capabilities of the third conference terminal; and
   modifying the content of the payload portion of the first data unit to generate the modified payload portion based on the capabilities of the third conference terminal.

4. The method as recited in claim 3, wherein the third conference terminal comprises a mobile device.

5. The method as recited in claim 4, wherein the third conference terminal comprises a wireless phone.

6. The method as recited in claim 3, wherein determining one or more capabilities of the third conference terminal comprises determining one or more hardware dictated capabilities.

7. The method as recited in claim 6, wherein detecting one or more hardware dictated capabilities of the third conference terminal comprises detecting a display capability of the third conference terminal.

8. The method as recited in claim 1, further comprising modifying one or more attributes of the payload portion of the first data unit to generate the modified payload portion.

9. The method as recited in claim 8, wherein the one or more attributes of the payload portion of the first data unit comprise one or more of a resolution or a frame rate.

10. The method as recited in claim 8, further comprising:
    identifying a user-defined filtering parameter associated with the third conference terminal; and
    modifying the content of the payload portion of the first data unit to generate the modified payload portion based on the user-defined filtering parameter associated with the third conference terminal.

11. The method as recited in 10, wherein the user-defined filtering parameter comprises a request to mute audio from a particular conferencing participant.

12. The method as recited in claim 11, wherein modifying the content of the payload portion of the first data unit to generate the modified payload portion comprises removing an audio signal associated with the particular conference participant from the payload portion of the first data unit.

13. The method as recited in claim 1, further comprising:
    enabling the second conference terminal to perform synchronous conferencing; and
    sending data units to the third conference terminal.

14. A method comprising:
    receiving a first data unit from a first conference terminal, the first data unit comprising a payload portion and a first attribute portion;
    determining one or more capabilities of a second conference terminal;
    modifying, by at least one processor, a content of the payload portion of the first data unit to generate a modified payload portion based on the capabilities of the second conference terminal by removing a video signal or an audio signal from the payload portion of the first data unit;
    duplicating the payload portion of the data unit;
    associating a second attribute portion with the modified payload portion based on the capabilities of the second conference terminal to generate a second data unit;
    sending the second data unit to a second conference terminal;
    determining one or more capabilities of a third conference terminal;
    modifying, by at least one processor, the content of the payload portion of the first data unit to generate a modified payload portion based on the capabilities of the third conference terminal;

associating a third attribute portion with the modified payload portion based on the capabilities of the third conference terminal to generate a third data unit; and sending the third data unit to the third conference terminal.

15. The method as recited in claim 14, wherein the second conference terminal comprises a mobile device.

16. The method as recited in claim 15, wherein the second conference terminal comprises a wireless phone.

17. The method as recited in claim 16, wherein determining one or more capabilities of the second conference terminal comprises determining one or more hardware dictated capabilities.

18. The method as recited in claim 17, wherein determining one or more hardware dictated capabilities of the second conference terminal comprises detecting a display capability of the second conference terminal.

19. The method as recited in claim 18, further comprising modifying one or more attributes of the payload portion of the first data unit to generate the modified payload portion.

20. The method as recited in claim 19, wherein the one or more attributes of the payload portion of the first data unit comprise one or more of a resolution or a frame rate.

21. The method as recited in claim 14, further comprising:
identifying a user-defined filtering parameter associated with the second conference terminal; and
modifying the content of the payload portion of the first data unit to generate the modified payload portion based on the user-defined filtering parameter associated with the second conference terminal.

22. The method as recited in claim 21, wherein the user-defined filtering parameter comprises a request to mute audio from a particular conferencing participant.

23. The method as recited in claim 22, wherein modifying the content of the payload portion of the first data unit to generate the modified payload portion comprises removing an audio signal associated with the particular conference participant from the payload portion of the data unit.

24. The method as recited in claim 14, wherein associating a second attribute portion with the modified payload portion to generate a second data unit comprises changing an IP destination address in an IP header of the data unit to reflect destination address information of the second conference terminal.

25. The method as recited in claim 14, further comprising:
determining one or more capabilities of the second conference terminal, wherein determining one or more capabilities of the second conference terminal comprises determining whether the second conference terminal has a camera from which to generate video content.

26. The method as recited in claim 25, wherein modifying the content of the payload portion of the first data unit comprises removing video content from the payload portion based on a determination that the second conference terminal does not have a camera from which to generate video content.

27. The method as recited in claim 14, wherein determining one or more capabilities of the second conference terminal comprises determining an input capability of the second conference terminal.

28. The method as recited in claim 14, wherein determining one or more capabilities of the second conference terminal comprises determining an output capability of the second conference terminal.

29. A system comprising:
at least one processor; and
at least one non-transitory computer readable storage medium storing instructions thereon that, when executed by the at least one processor, cause the system to:
receive a first data unit from a first conference terminal, the first data unit comprising a payload portion and a first attribute portion;
modify a content of the payload portion of the first data unit to generate a modified payload portion, wherein modifying the content of the payload portion of the first data unit to generate the modified payload portion comprises removing a video signal or an audio signal from the payload portion of the first data unit;
duplicating the payload portion of the data unit;
associate a second attribute portion with the modified payload portion to generate a second data unit;
send the second data unit to a second conference terminal;
associate a third attribute portion with the modified payload portion to generate a third data unit; and
send the third data unit to a third conference terminal.

30. The system as recited in claim 29, wherein the second conference terminal comprises a mobile device.

31. The system as recited in claim 30, further comprising instructions that, when executed by the at least one processor, cause the system to modify one or more attributes of the payload portion of the first data unit to generate the modified payload portion.

32. The system as recited in claim 31, wherein the one or more attributes of the payload portion of the first data unit comprise one or more of a resolution or a frame rate.

33. The system as recited in claim 29, further comprising instructions that, when executed by the at least one processor, cause the system to:
identify a user-defined filtering parameter associated with the second conference terminal; and
modify the content of the payload portion of the first data unit to generate the modified payload portion based on the user-defined filtering parameter associated with the second conference terminal.

* * * * *